United States Patent [19]

Tremarco

[11] 4,238,665
[45] Dec. 9, 1980

[54] ELECTRICALLY HEAT TOOL
[76] Inventor: Paul Tremarco, 108 Long Pond Rd., Hewitt, N.J. 07421
[21] Appl. No.: 880,338
[22] Filed: Feb. 23, 1978
[51] Int. Cl.³ .......................... B23K 3/02; H05B 1/00
[52] U.S. Cl. ...................................... 219/238; 38/90; 156/579; 156/583.4; 219/228; 219/240; 219/243; 219/501; 219/533; 228/55
[58] Field of Search .......................... 219/221, 227–241, 219/533, 243, 501; 156/581, 583, 579; 38/93, 82, 90; 322/23 SC; 228/51–55

[56] References Cited
U.S. PATENT DOCUMENTS

| | | | |
|---|---|---|---|
| 1,157,343 | 10/1915 | Thompson | 219/228 |
| 1,816,113 | 7/1931 | Feld | 219/227 |
| 1,909,774 | 5/1933 | Lindsay | 219/236 X |
| 2,014,196 | 9/1935 | Raffles | 219/221 X |
| 2,283,343 | 5/1942 | Weiskopf | 219/227 X |
| 2,383,699 | 8/1945 | Atkinson | 219/229 |
| 2,417,943 | 3/1947 | Muller | 219/228 X |
| 2,452,259 | 10/1948 | Pabis | 219/238 |
| 2,468,818 | 5/1949 | Fox et al. | 219/238 X |
| 2,735,923 | 2/1956 | Juvinall et al. | 219/237 |
| 3,435,188 | 3/1969 | Collard | 219/237 |
| 3,466,529 | 9/1969 | Grafham | 323/22 SC |
| 3,480,461 | 11/1969 | Lynge | 38/93 X |
| 3,711,678 | 1/1973 | Kuus | 219/236 |

FOREIGN PATENT DOCUMENTS 523680  4/1955  Italy ...................................... 219/236

Primary Examiner—A. Bartis
Attorney, Agent, or Firm—Kenyon & Kenyon

[57] ABSTRACT

A tool which is particularly useful in sealing plastic materials used in constructing model airplanes or for soldering is disclosed. The tool includes a handle containing a full wave AC control and heating shoe containing first and second bores. A sleeve has one end detachably connected to the handle and has inserted in its other end a cylindrical heating cartridge. The heating cartridge and sleeve are inserted into the bores in the heating shoe and held in place by means of a a set screw. The sleeve has an enlarged collar portion which engages the end of the heating shoe. An insulating collar of polytetrafluoroethylene surrounds the portion of the sleeve extending from the collar portion to the handle and minimizes heat transfer from the heating shoe and sleeve to the handle. The external surface of the heating shoe may be provided with a non-stick coating. The heating cartridge is connected to the AC line through the control in the handle to permit controlling degree of heat.

9 Claims, 4 Drawing Figures

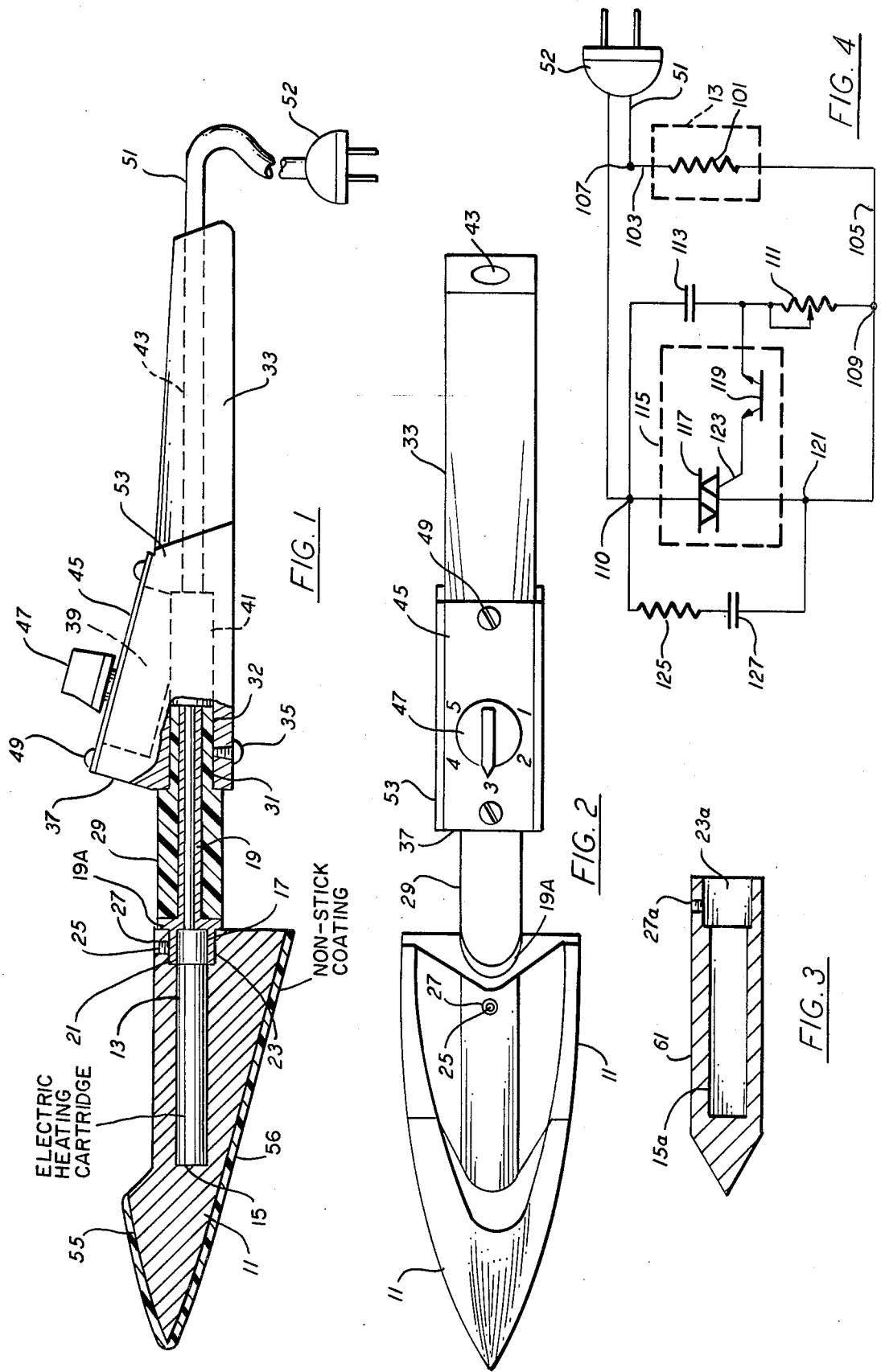

ELECTRICALLY HEAT TOOL

BACKGROUND OF THE INVENTION

This invention relates to heat sealing tools in general and more particularly to a heat sealing tool which provides a greater degree of maintainability and flexibility than tools previously available.

Various types of heat sealing tools have been developed. An example of such is that disclosed in U.S. Pat. No. 3,523,176 which discloses an electric iron for heat sensitive adhesive tape for seaming carpets. As is conventional in devices of this type, it includes a handle, a heat control, a sole plate or heating shoe and a heating element disposed within the sole. The heating element in this particular device comprises an electric resistance heating element disposed within the sole plate. As shown in FIG. 7 thereof, the element follows a U-shape within the sole plate and terminates in terminals on each end.

Another type of heating tool is disclosed in U.S. Pat. No. 2,768,272. This is a tool for heat sealing thermoplastic material. It does not include a heat control, but otherwise has essentially the same parts as the tool for sealing carpets. In this patent it is simply stated that the heater shoe or plate is heated by suitable electric resistance which is not shown.

Another similar device is disclosed in U.S. Pat. No. 2,814,710. Like the device of U.S. Pat. No. 3,523,176, it includes a U-shaped heating unit which is disposed in a U-shaped recess in the heat transfer shoe. The shoe is covered with "Teflon."

U.S. Pat. No. 2,838,647 discloses a heat shield for a heat sealer of the general type employed in sealing packages in plastic film. The purpose of the shield is to provide a disposable unit to insure that at all times a smooth surface is available.

A further thermal sealing device is disclosed in U.S. Pat. No. 2,609,316. As with the other devices, it includes a handle, heating shoe or sole plate, thermostat and heating unit. The invention is directed primarily to a sole construction in which a multi-layer sole is adhesively attached to the iron.

SUMMARY OF THE INVENTION

It is the object of the present invention to provide an improved sealing device of the general nature of those described above which is particularly useful in heat sealing plastic materials used in making models such as model airplanes, which heat sealing tool provides ease of maintainability and improved flexibility.

This object is obtained by providing a heat sealing tool which uses, as its heating element, a cylindrical electrical heating cartridge. The tool includes a handle having a heating control disposed therein with a sleeve extending from the handle. The sleeve contains a bore to accept the end of the heating cartridge. The heating shoe has an internal bore of a first diameter for accepting the heating cartridge and a bore of a second diameter for accepting the end of the sleeve. The shoe is held on the sleeve with a single set screw. The bore within the shoe is sized so as to properly retain the cartridge therein without additional retaining means. Appropriate wiring interconnects the cartridge and thermostat and the tool is equipped with a plug for supplying power.

In accordance with a further feature of the present invention, the sleeve is covered with an insulating collar so that there is no contact between the handle and the sleeve, which will become heated from the cartridge, thereby impeding heat transfer to the handle and keeping it cool when in use. Further protection against heat is accomplished by providing cork insulating pieces on the sides of the handles.

The heat control comprises a full-wave AC phase control utilizing a quadrac so that the temperature of the tool can be accurately controlled.

In accordance with a further feature of the present invention, the heating shoe used for heat sealing can be replaced with a soldering iron tip. To do so simply requires loosening the set screw, removing the heat sealing shoe and replacing the shoe with the soldering iron tip. For the modelist in particular, this is quite attractive since it allows him to both heat seal and solder with a single tool.

Another potential use for the tool of the present invention is in photographic work where an enlargement, e.g., an 8×10 print, is heat sealed to a mat for framing.

BRIEF DESCRIPTION OF THE DRAWINGS

FIG. 1 is the side view, partially cut away, of the tool of the present invention.

FIG. 2 is a plan view of the heat sealing tool of FIG. 1 with the base of the shoe flat and the handle extending upward at an angle.

FIG. 3 is a similar view of the soldering iron tip for use with the tool of FIGS. 1 and 2.

FIG. 4 is a schematic diagram of the electrical circuit of the tool of the present invention.

DETAILED DESCRIPTION OF THE INVENTION

As illustrated by FIGS. 1 and 2, the heat sealing tool of the present invention includes shoe 11, preferably made of cast hardened aluminum in which there is disposed a cylindrical electrical heating cartridge 13. In order to accept the cartridge 13, the heating shoe 11 contains a first internal bore 15 having a size slightly greater than the diameter of the heating cartridge 13 and a length corresponding to the length of the cartridge. The cartridge has leads extending from its right-hand end as viewed in the drawing. This end of the cartridge is disposed in an appropriate bore 17 in a sleeve 19. The sleeve 19 has an enlarged end 21 which is inserted into an appropriate enlarged bore section 23 in the shoe 11. The sleeve is retained in place in the shoe 11 by means of a set screw 25 which is screwed into a tapped hole 27 in the shoe 11. The sleeve is preferably made of cold rolled steel and is provided with an intermediate collar portion 19A which engages the end of heating shoe 11.

Surrounding the sleeve 19 is an insulating collar 29 made of an insulating material. In the preferred embodiment, this collar is made of polytetrafluoroethylene (sold under the Trademark "Teflon" by duPont). The insulating collar 29 has a portion 31 of smaller diameter on its end which is inserted into an appropriate bore 32 in a handle 33. The other end of the collar has a diameter substantially equal to the diameter of the collar portion 19A of sleeve 19. The handle 33 can be made of any non-conductive material such as wood, plastic, etc. In the preferred embodiment, this handle is made of wood. The insulating collar and metal sleeve are retained in the handle by a screw 35 screwed through the bottom of the handle. The handle 33 has an angular raised portion 37 in which there is formed a hollow recess 39. The hollow recess 39 is in communication with an extension 41 of the bore 32. A smaller bore 43 extends through to the back of the handle. A name plate 45 containing a control knob 47 for setting the degree of heat covers the recess 39 and is retained in place by screws 49. As will be seen in the discussion of the electric schematic of the tool below, the knob 47 is on the shaft of a potentiometer, the potentiometer and the other control means to be described below retained within the opening 39. Extending from the bore 43 is a power cord 51 having on its end a plug 52. The power cord is brought into the bore 41 and the recess 39 where it is connected to the elements of the control system. Similarly, lines from the cartridge 13 are brought through the sleeve 19 to this space in order to make the necessary connections.

It will be seen, that the steel sleeve 19 is retained completely within the insulating collar 29 and thus does not contact the handle 43 at all. This prevents a large flow of heat from the heating element to the handle and avoids a burn hazard at the handle for the user. To provide further protection, cork pieces 53 are glued onto the sides of the handle in the area directly below the name plate 45.

The ease of assembly and replacement of parts in the tool in the present invention should be evident. Access for repair or replacement of the control unit is obtained simply by removal of the two screws 49. The attachment between the handle and the sleeve 19 is simply by means of the screw 35. Most important however, is the ease of replacement of the shoe. In the preferred embodiment, the shoe, on the base and preferably on the curved top surface 55, is coated with polytetrafluoroethylene to give a non-stick coating. As is known, such coatings wear off and cannot easily be replaced by the user. When such occurs with the heating tool of the present invention, the user need only remove the set screw 25 and slip off the shoe 11. The user can then return the shoe to the manufacturer or dealer and obtain a replacement. The worn shoe can then be recycled and recoated with polytetrafluoroethylene. Similarly, replacement of the heating unit can be done in simple fashion.

The ease of replacement of the shoe also permits other uses of the tool of the present invention. Such is illustrated by FIG. 3. Shown is a soldering iron tip 61. The soldering iron tip 61 contains the same bores, designated as 15a and 23a, as does the shoe. It also contains a tapped hole 27a for securing it to the sleeve 19. Thus, the hobbyist who uses a tool of this nature for heat sealing model airplanes when he finds the need to solder some part may simply remove his heat sealing shoe and replace it with a solder iron adaptor. The tip 61 preferably is made of cold rolled steel.

FIG. 4 is an electrical schematic of the resistance heater and its control system. Within the cartridge 13 is a resistance element 101. Extending from the element 101 are leads 103 and 105. The lead 103 terminates at a terminal 107 where it is connected to one of the power leads of the AC power cord 51. The lead 105 connects to a terminal 109. Coupled across this terminal and a terminal 110 where the other line of the power cord 51 terminates is a potentiometer 111 and a capacitor 113 in series. Also coupled to the terminal point 110 is a quadrac 115, a device which includes within it a triac 117 and diac 119. The other side of the triac 117, at a terminal 121, is coupled to the terminal 109. Thus, the triac 117 is in series with the load, i.e., heating element, 101. The gate 123 of the triac is coupled through the diac 119 to the junction point between the capacitor 113 and the potentiometer 111. The potentiometer 111 has its shaft extending through the name plate 45 of FIGS. 1 and 2 and has on the end thereof the control knob 47. Coupled across the quadrac 115 is a resistor 125 and capacitor 127 in series. The potentiometer 111 establishes the firing point of the triac 117 and thus this circuit provides full-wave AC phase control permitting an excellent adjustment of the power supplied to the load 101 and thus to the heat generated.

In a device contructed particularly for use in heat sealing hobby applications such as use with model airplanes and photography, the electrical heating cartridge 13 is a 100 Watt unit, capacitors 113 and 127 have a value of 0.047 uF, potentiometer a value of 500K and resistor 125 a value of 4700 ohms. The overall length of the tool is approximately 1 foot to give an idea of its relative size.

It should be recognized that other embodiments of the heating tool of the present invention for other purposes are possible. As an example, the heating shoe can be modified to have a shape similar to that of the device described in the aforementioned U.S. Pat. No. 3,523,176 and a larger heating cartridge, e.g., 200 Watts, used to provide a heating tool adaptable for seaming carpets. These and other modifications may be made without departing from the spirit of the invention which is intended to be limited solely by the appended claims.

What is claimed is:
1. A heating tool comprising:
(a) a handle having a bore in one end thereof and an intermediate recess adjacent said bore, said bore opening into said recess;
(b) a heating shoe having a first internal bore of a first diameter and a second bore of a greater diameter extending outwardly therefrom;
(c) a cylindrical heating cartridge of an outer diameter matched to said first internal bore in said heating shoe inserted into said first internal bore;
(d) a sleeve comprising a unitary cylindrical member with a central bore therethrough, said sleeve having a first end section of an outer diameter matched to the inner diameter of said second bore of said shoe, an enlarged collar portion inwardly of said first end section and a second end section extending from the other side of said collar portion, the central bore of said first end section being enlarged, said heating cartridge having an end disposed in said enlarged central bore, said first end section of said sleeve being inserted into said second bore with said collar portion abutting against the end of said shoe, said second end section extending into the bore of said handle;
(e) an insulating collar having a bore of a diameter matched to the outer diameter of said second end section and having a first end of outer diameter substantially equal to the diameter of said collar portion and a second end of diameter matched to said bore in said handle, said collar having a length substantially equal to the length of said second end section, surrounding said second end section with said first end abutting against said collar and said second end inserted in the bore in said handle, said insulating collar thereby extending between said handle and said heating shoe and sleeve and minimizing heat transfer between said heating shoe and sleeve and said handle;

(f) means for detachably connecting the first end section of said said sleeve to said shoe;

(g) means for detachably connecting the second end of said collar and second end section of said sleeve to said handle;

(h) a heat control capable of varying the amount of power supplied to the electric heating cartridge, to thereby control the heat generated by it, disposed it said recess of said handle; and (i) wiring means extending through the central bore in said sleeve interconnecting said cartridge and heat control; and (j) wiring interconnected with said heat control, extending from said handle to a plug, for supplying power to said heat sealing tool.

2. The tool according to claim 1 wherein said insulating collar is made of polytetrafluoroethylene.

3. The tool according to claim 2 and further including insulating pads attached to the outsides of said handle adjacent to the point of attachment with said insulating collar.

4. The tool according to claim 3 wherein said insulating pads comprise cork which is cemented to said handle.

5. A tool according to claim 1 wherein said means for detachably connecting comprise a threaded hole in said heating shoe extending from outside said shoe to said second bore and a set screw screwed into said threaded hole for retaining said sleeve.

6. A tool according to claim 5 wherein said heating shoe comprises a soldering tip.

7. A tool according to claim 1 wherein said heat control comprises a full-wave AC phase control.

8. The tool according to claim 1 wherein said heating shoe is externally coated with a non-stick coating.

9. A tool according to claim 8 wherein said coating comprises polytetrafluoroethylene.

* * * * *